United States Patent [19]

Kiyooka et al.

[11] Patent Number: 5,402,576
[45] Date of Patent: Apr. 4, 1995

[54] MOWING APPARATUS

[75] Inventors: Katsumi Kiyooka; Kouichi Shinotsuka, Chiba, Japan

[73] Assignee: Maruyama Mfg. Co., Inc., Tokyo, Japan

[21] Appl. No.: 117,667

[22] Filed: Sep. 8, 1993

[30] Foreign Application Priority Data

Sep. 8, 1992 [JP] Japan .................. 4-68811 U
Sep. 9, 1992 [JP] Japan .................. 4-69161 U

[51] Int. Cl.⁶ ............................................. B26B 19/12
[52] U.S. Cl. .................................... 30/216; 30/228
[58] Field of Search ............... 30/210, 216, 228, 43.8, 30/223, 347, 369, 276, 264

[56] References Cited

U.S. PATENT DOCUMENTS

| | | | |
|---|---|---|---|
| 2,840,904 | 7/1958 | Hutchins | 30/210 |
| 2,982,023 | 5/1961 | Crooks et al. | 30/216 |
| 3,073,027 | 1/1963 | O'Neilly | 30/216 |
| 3,132,424 | 5/1964 | Kirkland | 30/210 |
| 3,857,177 | 12/1974 | Karubian et al. | 30/216 |

FOREIGN PATENT DOCUMENTS 61-21941 7/1986 Japan .
2-255007 10/1990 Japan .
4-74917 6/1992 Japan .

Primary Examiner—Douglas D. Watts
Attorney, Agent, or Firm—Cushman, Darby & Cushman

[57] ABSTRACT

A mowing apparatus has an elongated handling rod on the distal end of which is mounted a gear unit having a casing and an output shaft which extends substantially perpendicularly to the handling rod. The apparatus further includes a first disk cutting blade mounted so as to cover the side of the casing adjacent the output shaft, and a second disk cutting blade superposed on the side of the first disk cutting blade adjacent the casing. A connecting pin interconnects the first and second disk cutting blades such that the disk cutting blades are rotatable relative to each other about their axes. An eccentric shaft is adapted to revolve about the axis of the output shaft in accordance with the rotation of the output shaft, and is received in a cam slot provided for rotation as a unit with the second disk cutting blade about the connecting pin, so that the can slot reciprocate circumferentially about the connecting pin in accordance with the revolution of the eccentric shaft. A rod-like fixing member for fixing the first disk cutting blade to the casing extends through an aperture formed in the second disk cutting blade so as not to interfere with the second disk cutting blade during relative oscillation of the second disk blade relative to the first disk cutting blade.

11 Claims, 5 Drawing Sheets

MOWING APPARATUS

BACKGROUND OF THE INVENTION

1. Field of the Invention

The present invention relates to a mower for mowing grass such as lawn and, more particularly, to a mowing apparatus which has a pair of disk cutting blades superposed one on the other.

2. Description of the Related Art

Japanese Patent Laid-Open No. 2-255007 discloses a mowing apparatus having a pair of superposed disk cutting blades which rotate in opposite directions. This known mowing apparatus incorporates a complicated mechanisms for driving the disk blades. In addition, this known mowing apparatus dangerously propels stones, grass and mud towards the operator when the rotating disk cutting blades impinge upon such stones or the like.

In order to eliminate this problem, Japanese Utility Model Publication No. 61-21941, as well as the microfilm of the specification and drawings of Japanese Utility Model Application No. 2-117192 (Japanese Utility Model Laid-Open No. 4-74917), discloses a mowing apparatus which incorporates, in place of the disk cutting blades, a pair of rectangular cutting blades which are elongated in horizontal or vertical directions and which are provided at their front ends with cutting edges, the cutting blades being reciprocately driven in the longitudinal direction so as to cut the lawn grass or the like while avoiding the propelling of stones or the like towards the operator.

The above-mentioned mowing apparatus, which is disclosed in Japanese Utility Model Publication No. 61-21941, as well as the microfilm of the specification and drawings of Japanese Utility Model Application No. 2-117192 (Japanese Utility Model Laid-Open No. 4-74917), has a drawback in that since the cutting blades are elongated horizontally, it is not possible to cut grasses at the shorter sides of the cutting blades.

SUMMARY OF THE INVENTION

It is therefore a first object of the present invention to provide a mowing apparatus which, while maintaining high efficiency offered by disk cutting blades, prevents stones or the like from being scattered towards the operator.

A second object of the present invention is to provide a mowing apparatus which, when used while resting on a tree or the like, effectively cuts the objects without damaging the tree or the like.

A third object of the present invention is to provide a mowing apparatus which can simply replace the disk cutting blade.

A fourth object of the present invention is to provide a mowing apparatus which is improved to permit easy remounting of the disk cutting blades.

A fifth object of the present invention is to provide a mowing apparatus in which shearing performance is improved at the peripheral edge of the disk cutting blades.

To these ends, according to one aspect of the present invention, there is provided a mowing apparatus, comprising: a handling rod; a gear unit including a casing and mounted on the distal end of the handling rod, the gear unit having an output shaft; a first cutting disk blade mounted so as to cover the side of the casing adjacent the output shaft; a second disk cutting blade superposed on the side of the first disk cutting blade adjacent the casing; a connecting pin which interconnects the first and second disk cutting blades such that the disk cutting blades are rotatable relative to each other about their axes; an eccentric shaft adapted to revolve about the axis of the output shaft in accordance with the rotation of the output shaft; a cam slot provided for rotation as a unit with the second disk cutting blade about the connecting pin and receiving the eccentric shaft so as to be reciprocate circumferentially about the connecting pin in accordance with the revolution of the eccentric shaft; and a rod-like fixing means for fixing the first disk cutting blade to the casing, the fixing means extending through an aperture formed in the second disk cutting blade so as not to interfere with the second disk cutting blade during relative oscillation of the second disk cutting blade relative to the first disk cutting blade.

According to a second aspect of the present invention, the second disk cutting blade has a diameter smaller than that of the first disk cutting blade.

According to a third aspect of the present invention, the rod-like fixing means includes a plurality of bolts.

According to a fourth aspect of the present invention, the cam slot has a form symmetrical with respect to the diametrical line of the second disk cutting blade.

According to a fifth aspect of the present invention, a spacer is disposed between the first disk cutting blade and the second disk cutting blade at a location near the cam slot.

In operation of the mowing apparatus of the first aspect, the eccentric shaft revolves at a predetermined radius around the axis of the output shaft in accordance with the rotation of the output shaft. The cam slot receives the eccentric shaft so that the revolution of the eccentric shaft causes the cam slot to make a reciprocatory oscillation about the connecting pin. A rod-like fixing member extends through an aperture formed in the second disk cutting blade so as to interconnect the first disk cutting blade and the casing, thus allowing the second disk cutting blade to reciprocate along a circumferential path centered at the connecting pin. Consequently, the second disk blade performs a circumferentially reciprocating motion with respect to the first disk cutting blade, so that the object to be cut are nipped and cut by cooperation between the cutting edges of the first and second disk cutting blades.

The mowing apparatus of the second aspect is used such that the first disk cutting blade which is fixed rests on a tree or the like, while the object is cut by cooperation between the cutting edges of the first and second disk cutting blades.

In the mowing apparatus of the third aspect, the first and/or the second disk cutting blade can easily be replaced with new disk cutting blades in a manner described below. For the replacement purpose, the bolt is loosened and removed so that the first disk cutting blade is freed from the casing. At the same time, second disk cutting blade also is freed as the bolt is removed and as the cam slot is disengaged from the eccentric shaft.

In the mowing apparatus of the fourth aspect, the eccentric shaft is received in the cam slot which is symmetrical with respect to the diametrical line of the second dusk cutting blade, i.e., to a line on the second disk cutting blade passing through the center of the connecting pin.

In the mowing apparatus of the fifth aspect, the second disk cutting blade is protruded by the spacer at a region around the cam slot, whereas, at the radially outer side of the spacer, pressed onto the first disk cutting blade whereby the first and second disk cutting blades make resilient contact at their peripheral cutting edges, thus enhancing the shearing effect.

These and other objects, features and advantages of the present invention will become clear from the following description of the preferred embodiments when the same is read in conjunction with the accompanying drawings.

DESCRIPTION OF THE PREFERRED EMBODIMENTS

Embodiments of the present invention will be described in detail with reference to the drawings.

Figure 1:
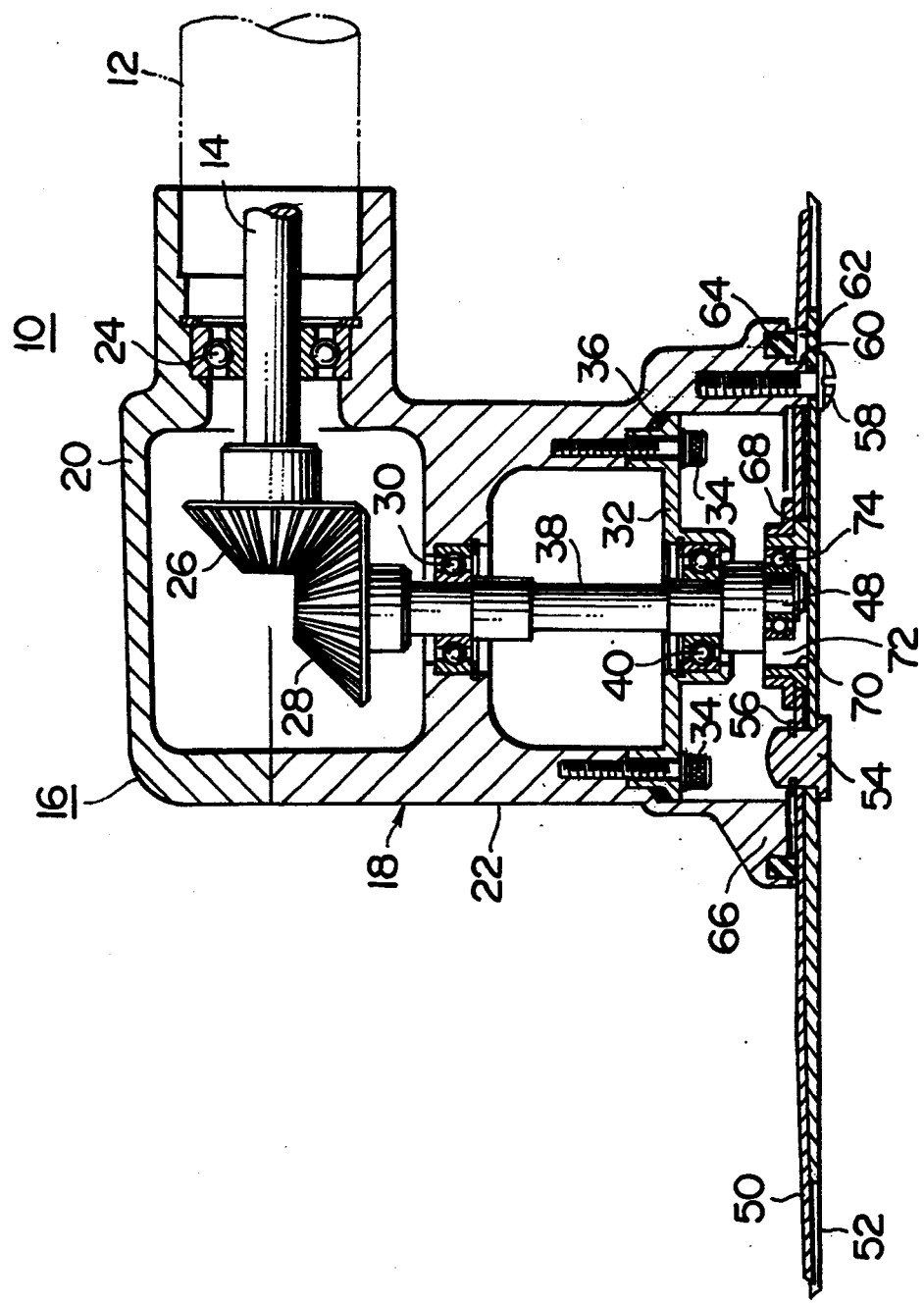
FIG. 1 is an illustration of the construction of the front end portion of a mowing apparatus embodying the present invention.

FIG. 1 is an illustration of the front end portion of a mowing apparatus. A handling rod 12 is coupled at its proximal end to a power unit (not shown) including an engine. A transmission shaft 14 extends through the handling rod 12 so as to transmit the torque of the power unit from the proximal end to the distal end of the rod 12. The gear unit 16 has a casing 18 provided on the front end of the handling rod 12 and including a tubular portion 22 and a cover 20 which closes open upper end (as viewed in FIG. 1) of the tubular portion 22. A ball bearing 24 is disposed in a portion of the casing 18 for receiving the transmission shaft 14 so as to rotatably support the distal end of the transmission shaft 14 on the casing 18. A driving bevel gear 26 and a driven bevel gear 28 are disposed in an upper space inside the casing 18 so as to mesh with each other. The driving bevel gear 26 is integrally fixed to the distal end of the transmission shaft 14 for rotation as a unit with the latter, while the driven bevel gear 28 is supported by a ball bearing 30 in a restricted portion of the casing 18. A bottom cover 32 is fitted in the lower end opening of the tubular portion 22 so as to close the lower opening, and is fixed to the tubular portion by means of a plurality of bolts 34. An "O" ring 36 is compressed between the tubular portion 22 and the bottom cover 32 so as to provide a seal at the joint therebetween.

The output shaft 38 is fixed at its upper end to the driven bevel gear 28 for unitary rotation therewith, and extends through the lower cover 32.

A ball bearing 40 is disposed in the portion of the bottom cover 32 penetrated by the output shaft 38, so as to rotatably support the output shaft 38 on the bottom cover 32 at an intermediate portion of the output shaft 38. The eccentric shaft 48 is formed integrally with the lower end of the output shaft 38 beneath the bottom cover 32, and is radially offset from the axis of the output shaft 38.

The movable disk cutting blade 50 and the stationary disk cutting blade 52 are superposed concentrically, such that the movable cutting blade 50 is interposed between the casing 18 and the stationary cutting blade 52. The connecting pin 54 is disposed at the center of the movable cutting blade 50 and the stationary cutting blade 52 and is extended from the outer side of the stationary cutting blade 52 through the stationary cutting blade 52 and the movable cutting blade 50. The connecting pin 54 is provided at its end with a snap ring 56 so as to interconnect the movable cutting blade 50 and the stationary cutting blade 52. A plurality of projections 60 are provided to slightly project downward from the lower side of the tubular portion 22 and extend through apertures 62 formed in the movable cutting blade 50. Bolts 58 are driven from the lower side of the stationary blade 52 into the threaded holes formed in the projections 60 so as to fix the stationary cutting blade 52 to the projections 60.

An annular felt packing 64 is received at its upper portion in an annular groove which is formed in the peripheral portion 66 of the lower side of the lower end of the tubular portion 22, while the lower end surface of the felt packing 64 slidingly engages the movable cutting blade 50. A sleeve frame 68 is secured to the movable blade 50 such that the center thereof is located on the axis of the output shaft 38, and has a bore which receives a sleeve 70. The sleeve 70 has an elongated circular hole 72 formed therein and a flange adjacent to the stationary cutting blade 52. The sleeve 70 is mounted such that the flange is interposed between the movable cutting blade 50 and the stationary blade 52. A ball bearing 74 has an inner race which fits on the outer peripheral surface of the eccentric shaft 48 and is received in the elongated circular hole 72 together with the eccentric shaft 48.

Figure 2:
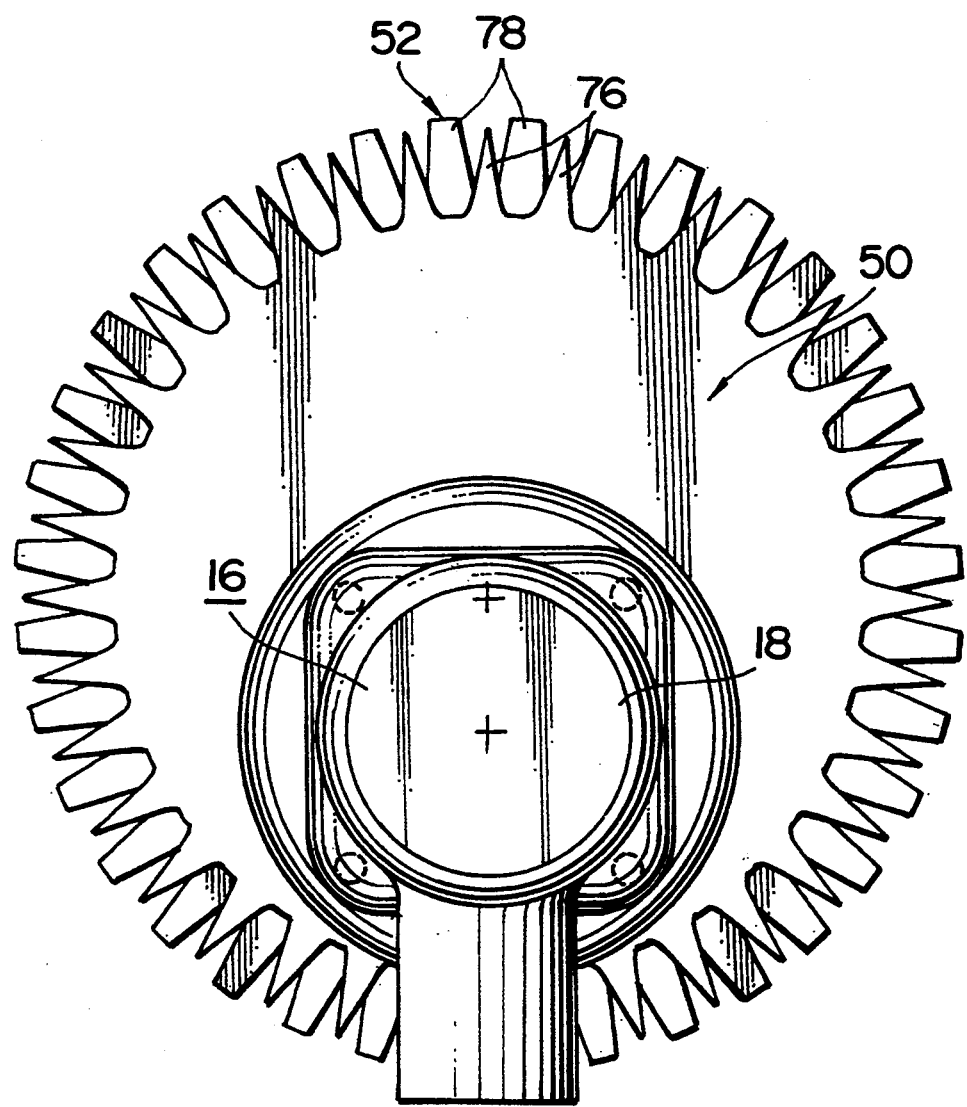
FIG. 2 is a top plan view of a gear unit incorporated in the embodiment.

FIG. 2 is a top plan view of the gear unit 16. The movable cutting blade 50 and the stationary cutting blade 52 are provided on their periphery with cutting edges 76 and 78. The movable cutting blade 50 has a diameter slightly smaller than that of the stationary cutting blade 52.

Figure 3:
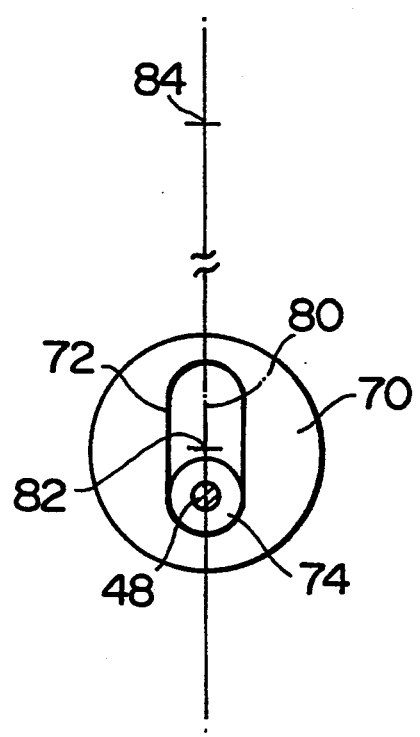
FIG. 3 is a view of a sleeve and other parts of the mowing apparatus as viewed in the direction of axis of an eccentric shaft.

FIG. 3 is an illustration of the sleeve 70 and other parts as viewed in the direction of the axis of the eccentric shaft 48. Numerals 82 and 84 respectively indicate the positions of the axes of the output shaft 38 and the connecting pin 54 which are shown in FIG. 1. The longitudinal axis 80 of the elongated circular hole 80 coincides with the straight line which passes the center 84, i.e., the diametrical line of the movable cutting blade 50. The elongated circular hole 72 has a form which is symmetrical with respect to the longitudinal axis line 80 and is elongated along this line 80. The ball bearing 74 has an outside diameter which is equal to the width of the elongated circular hole 72, so that the outer peripheral surface of the outer race of the ball bearing 74 contacts the portions of the inner peripheral surface of the elongated circular hole which opposes each other in the widthwise direction of the elongated circular hole 72. The eccentric shaft 48 revolves around the center 82 in accordance with the rotation of the output shaft 38, so that the sleeve 70 reciprocates circumferentially about the center 84.

Figure 4:
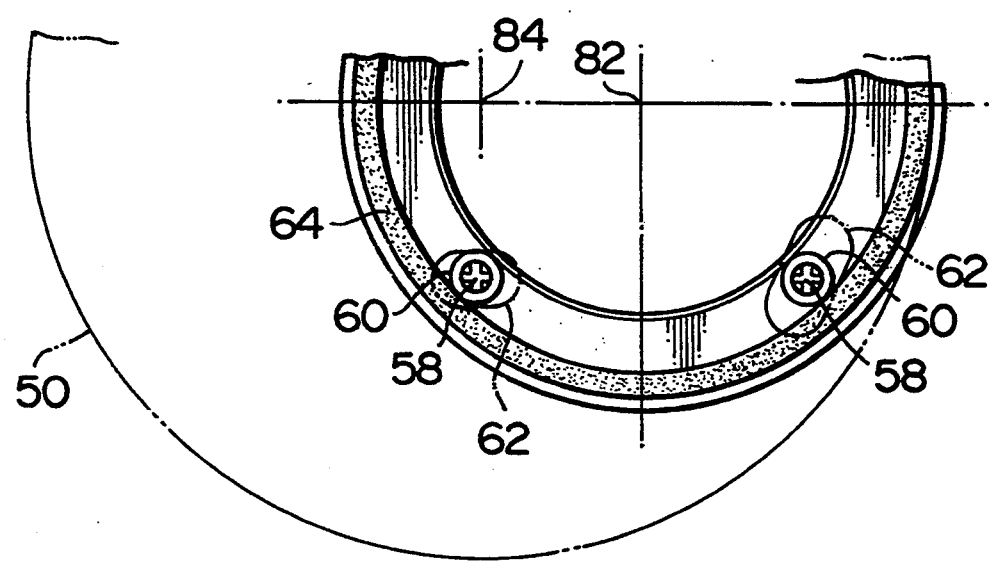
FIG. 4 is an illustration showing the shapes of apertures.

FIG. 4 illustrates the configurations of the apertures 62. Each aperture has a form which is symmetrical with respect to the straight line passing through the center 84 and which is elongated circumferentially about the center 84. This elongated form of the aperture 62 prevents the projections 60 from colliding with the edges of the apertures 62 during reciprocating angular motion of the movable cutting blade centered at the center 84.

A description will now be given of the operation of the embodiment.

The eccentric shaft 48 is received in a sleeve 70 which has a symmetric form with respect to a straight line on the movable cutting blade 50 passing through the center of the connecting pin 54, so that the movable cutting blade 50 can easily be mounted on the eccentric shaft 48.

The driving torque from the power unit on the proximal end of the handling rod 12 is transmitted through the transmission shaft 14 to the driving bevel gear 26, so that the driven bevel gear 28 and the output shaft 38 rotate about the axis of the casing 18. The eccentric shaft 48 revolves at a predetermined radius about the axis of the output shaft 38. The elongated circular hole 72 of the sleeve 70 receives the eccentric shaft 48 and the ball bearing mounted thereon, so that the sleeve 70 moves in the direction of the shorter axis of the elongated circular hole 72 so as to reciprocate circumferentially about the connecting pin 54. On the other hand, the bolt 58 extends through the aperture 2 in the movable cutting blade 50 so as to interconnect the stationary cutting blade 52 and the casing 18, while allowing the movable cutting blade 50 to reciprocate circumferentially with respect to the cutting blade 52. Consequently, the objects to be mowed is nipped between and cut by the cooperating cutting edges 76, 78 of the stationary and movable cutting blades 52, 50.

In the region where the output shaft 38 exists, the flange of the sleeve 70 is interposed between the movable cutting blade 50 and the stationary cutting blade 52, while the movable cutting blade 50 is pressed towards the stationary cutting blade 52 in the regions of the projections 60 which are radially outside the flange of the sleeve 70, whereby the pressure of contact between the cutting edges 76, 78 is enhanced to increase the shearing force between the cutting edges 76, 78.

The annular felt packing 64, which slidingly engage at its lower surface the upper surface of the aperture 62, effectively prevents any foreign matter from axially inwardly coming into the casing 18.

When the mowing operation is conducted while resting the apparatus on a tree or the like, the cutting blade 52 which has the greater diameter and which is stationary are held in contact with the tree or the like, such that the objects to be mowed by the cooperation between the cutting blades 76, 78 of the stationary and movable cutting blades 52, 50.

The bolt 58 can be withdrawn from the projections 60 for the purpose of replacing the movable and stationary cutting blades 50 and 52 with new blades, allowing the stationary cutting blade 52 to be removed from the casing 18. At this point, the movable cutting blade 50 can be separated from the apertures 62 while the eccentric shaft 48 is withdrawn from the sleeve 70.

Although the invention has been described with specific reference to an apparatus of the type in which the output shaft of the gear unit extends perpendicular to the handling rod, this is only illustrative and the invention may be applied to an apparatus of the type in which the output shaft of the gear unit extends in parallel with the input shaft of the gear unit, as in a second embodiment which will be described hereinafter with specific reference to FIG. 5.

Figure 5:
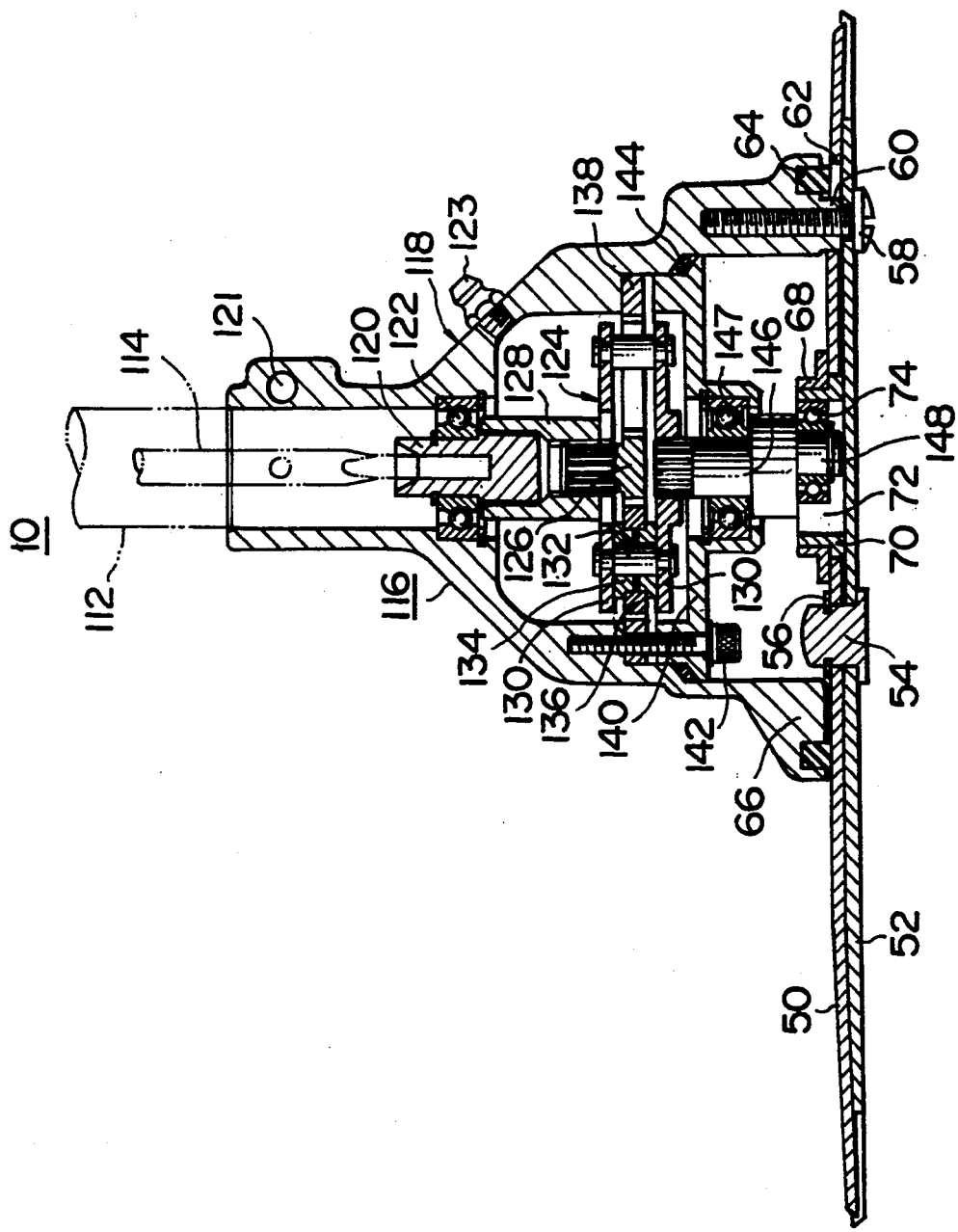
FIG. 5 is vertical sectional view of another embodiment of the mowing apparatus in accordance with the present invention.

FIG. 5 illustrates the construction of the front end of the second embodiment of the mowing apparatus 10 in accordance with the present invention. A power unit (not shown) including an engine is provided on the rear end of a handling rod 112. A transmission shaft 114 extends through the handling rod 112 in order to transmit power of the power unit from the proximal end to the distal end of the handling rod 112. A gear unit 116 has a casing 118 which is mounted on the front end of the handling rod 112. A connecting shaft 120 is rotatably supported through a ball bearing in a bore formed in the upper end of the casing 118 as viewed in FIG. 5, and has a bore which rotatably receives the distal end of the transmission shaft 114. Bolt holes 121 are formed in opposing portions of upper end portion of the casing 118 opposing each other across a slot, while a grease port 123 is formed in a tapered portion of the casing 118 so as to be used for the purpose of charging a grease into the space inside the casing 118 below the ball bearing 122. A planetary gear device 124 is disposed in the space inside the casing 118 below the ball bearing 122. The planetary gear device 124 includes a sun gear 126 coupled to the lower end of the connecting shaft 120 via a coupling 128, and a pair of carrier plates 130 which are opposed by and connected to each other by means of connecting pins 132. Rollers 134 are rotatably carried by the connecting pins 132. The planetary gear device 124 further includes a planetary gear 136 mounted on each roller 134 for rotation therewith in meshing engagement with the sun gear 126. A ring gear 138 is disposed coaxially with respect to the sun gear 126 in meshing engagement with the planetary gears 136. A bearing case 140 is attached to the casing 118 so as to close the lower end of the planetary gear device 124. A bolt 142 extends through a bearing casing 140 and a ring gear 138 and is driven into the casing 118, thereby fixing the bearing casing 140 and the ring gear 138 to the case 118. An "O" ring 144 is disposed between the casing 118 and the bearing casing 140 so as to be clamped therebetween, thus providing a seal in the joint surface between the casing 118 and the bearing casing 140. An output shaft 146 has upper end fitted in a bore formed in the center of the lower carrier plate 130 so as to be fixed to this carrier plate 130 for rotation as a unit therewith. The output shaft 146 further extends through the bearing casing 140 and is rotatably supported by the latter through a ball bearing 147. The eccentric shaft 148 is formed on the lower end of the output shaft 146 which is exposed to the exterior of the bearing casing 140, at an offset from the axis of the output shaft 146.

Thus, in this embodiment, the input shaft 120 and the output shaft 146 have axes which are parallel to each other.

Other portions of this embodiment are substantially the same as those in the first embodiment described in connection with FIGS. 1 to 4.

As will be understood from the foregoing description, the present invention offers the following advantages. In the first aspect of the present invention, the second disc cutting blade which is movable is adapted to reciprocate circumferentially with respect to the first disk cutting blade which is stationary. Therefore, any object which has collided with the movable second disk cutting blade is not scattered towards the operator, thus ensuring the user's safety and protecting the operator from being affected by, for example, mud or the like which otherwise would be scattered by the rotating disk cutting blade 50. In addition, the cutting blades are not elongated in the horizontal or vertical direction but are circular, so that any portion of the circumference of these cutting blades can be brought into contact with the objects to be mowed, by suitably inclining the handling rod with respect to the object. Consequently, the objects can be cut without any impediment, thus ensuring high efficiency of the mowing operation.

In the second aspect of the present invention, when the mowing operation is conducted while resting the apparatus on a tree or the like, the cutting blade which has the greater diameter and which is stationary, is held in contact with the tree or the like. Since the movable second cutting blade, which reciprocates in the circumferential direction within a predetermined angular range, has a diameter smaller than that of the first disk cutting blade, the object can be mowed without causing the tree or the like damage due to contact with the movable cutting disk.

In the third aspect of the present invention, the first and second disk cutting blades can easily be demounted simply by removing the bolts from the case. Thus, the replacement of the disk cutting blades with new cutting blades can be done without difficulty.

According to the fourth aspect, the cam slot has a form symmetrical with respect to a diametrical line of the second disk cutting blade, i.e., a line on the second disk cutting blade passing through the center of the connecting pin, whereby the insertion of the eccentric shaft into the cam slot and,hence, the assembling of the apparatus is facilitated.

According to the fifth aspect, the spacer exists in the region around the cam slot and is interposed between the first and second disk cutting blades. Consequently, the second disk cutting blade is protruded with respect to the first disk cutting blade in the region where the spacer is provided, while the rod-like fixing member pressed the second disk cutting blade onto the first disk cutting blade at the radially outer side of the spacer, whereby the first and second disk cutting blades are allowed to strongly contact with each other in the peripheral region, thus improving the shearing effect.

Although the invention has been described through its specific forms, it is to be noted that the described embodiments are only illustrative and various changes and modifications may be imparted thereto without departing from the scope of the invention which is limited solely by the appended claims.

What is claimed is:

1. A mowing apparatus, comprising:
   a handling rod;
   a gear unit having a casing and mounted on the distal end of said handling rod, said gear unit having an output shaft;
   a first disk cutting blade mounted so as to cover the side of said casing adjacent said output shaft;
   a second disk cutting blade superposed on the side of said first disk cutting blade adjacent said casing;
   a connecting pin which interconnects said first and second disk cutting blades such that said disk cutting blades are rotatable relative to each other about their axes;
   an eccentric shaft adapted to revolve about the axis of said output shaft in accordance with the rotation of said output shaft;
   a cam slot provided for rotation as a unit with said second disk blade about said connecting pin and receiving said eccentric shaft so as to be reciprocatably circumferentially about said connecting pin in accordance with the revolution of said eccentric shaft; and
   a rod-like fixing means for fixing said first disk cutting blade to said casing, said fixing means extending through an aperture formed in said second disk cutting blade so as not to interfere with said second disk cutting blade during relative oscillation of the second disk cutting blade relative to said first disk cutting blade.

2. A mowing apparatus according to claim 1, wherein said output shaft of said gear unit extends substantially perpendicular to said handling rod.

3. A mowing apparatus according to claim 1, wherein said gear unit includes a planetary gear mechanism so that the input and output shafts of said gear have axes which are parallel to each other.

4. A mowing apparatus according to claim 2, wherein said second disk cutting blade has a diameter smaller than that of said first disk cutting blade.

5. A mowing apparatus according to claim 2, wherein said rod-like fixing means includes a plurality of bolts.

6. A mowing apparatus according to claim 2, wherein said cam slot has a form symmetrical with respect to a diametrical line of said second disk cutting blade.

7. A mowing apparatus according to claim 2, further comprising a spacer provided in the region around said cam slot and disposed between said first and second disk cutting blades.

8. A mowing apparatus according to claim 3, wherein said second disk cutting blade has a diameter smaller than that of said first disk cutting blade.

9. A mowing apparatus according to claim 3, wherein said rod-like fixing means includes a plurality of bolts.

10. A mowing apparatus according to claim 3, wherein said cam slot has a form symmetrical with respect to a diametrical line of said second disk cutting blade.

11. A mowing apparatus according to claim 3, further comprising a spacer provided in the region around said cam slot and disposed between said firsta nd second disk cutting blades.

* * * * *